United States Patent

[11] 3,567,976

[72] Inventor: Max Alth
 6 Tamarack Road, Port Chester, N.Y. 10573
[21] Appl. No.: 841,938
[22] Filed: July 15, 1969
[45] Patented: Mar. 2, 1971

[54] EDDY CURRENT BRAKES
 5 Claims, 4 Drawing Figs.
[52] U.S. Cl. .................................... 310/93,
  310/68, 310/95, 310/268
[51] Int. Cl. .................................... H02k 49/04
[50] Field of Search .......................... 310/93,
  105, 95 (Inquired), 168, 268, 68 (Cursory)

[56] References Cited
UNITED STATES PATENTS

| | | | | |
|---|---|---|---|---|
| 2,617,052 | 11/1952 | Bessiere | | 310/93 |
| 3,243,621 | 3/1966 | Wesolowski | | 310/168 |

Primary Examiner—D. X. Sliney

ABSTRACT: The brake is an AC generator with shorted turn output coils formed by iron bars fixed about a central hole in a massive plate of copper or aluminum. The field is furnished by a hollow-core coil mounted axially in said hole. The shaft to be braked passes through the center of the field coil. Iron bars, mounted as a pair, on either side of the plate and coil are keyed to said shaft; they rotate with the shaft and sweep the magnetic field over said iron poles and surrounding conductive metal. Braking is controlled by varying field strength. No heavy currents are switched, no coils rotate and a single metal plate serves as the shorted secondaries and radiates generated heat.

EDDY CURRENT BRAKES

The information herein disclosed is an extension and further development of the invention disclosed in this inventor's U.S. Pat. application, filed Feb. 28, 1969, Ser. No. 803,485 Inductor-Type Alternator and Synchronous Motor.

The purpose of this invention is to provide an improved means for safely, dependably reducing the speed of rotating shafts, most specifically shafts related to motor vehicles.

The present invention has features not to be found in existing breaks of this generic type. Neither the field coil nor the armature coils, hereafter called output coils, rotate. There are no slip rings and attendant brushes. The field current alone is varied to control braking. The shorted turn output coils are massive and serve as heat sink, heat-radiating means and support. The output coils may be formed of a single plate or several plates with internal passages for water cooling. Alignment between rotating shaft and brake need not be perfect, but may vary during rotation. The brake need not be integral with the shaft; it is simply slipped over the shaft and keyed. This makes it removable for possible transfer to another vehicle. DC power for the field coil may be furnished by the an external source such as the vehicle's generating system, or by a current generated by the brake itself.

For light work, the field may be supplied by permanent magnets and the output coils switched.

Figure 1:
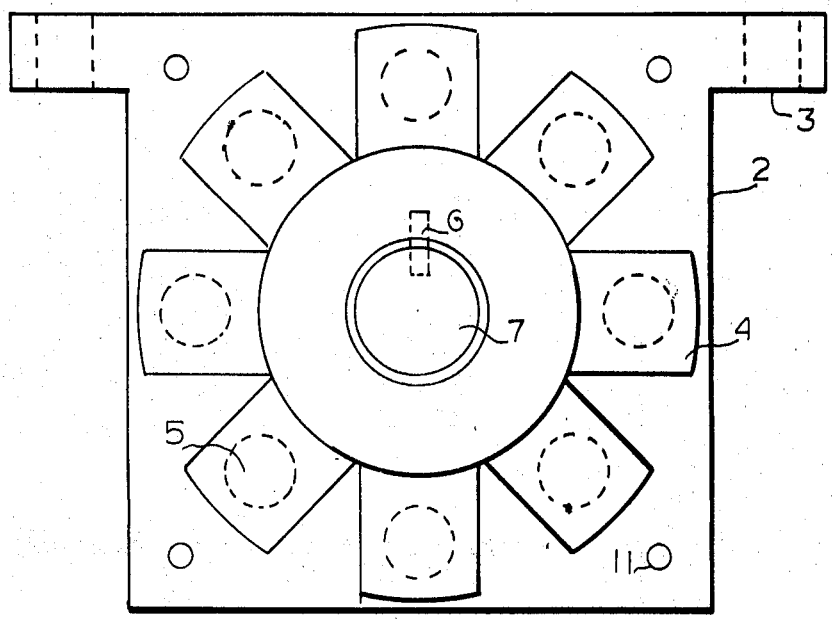
FIG. 1 is an end view of the eddy current brake.
Figure 2:
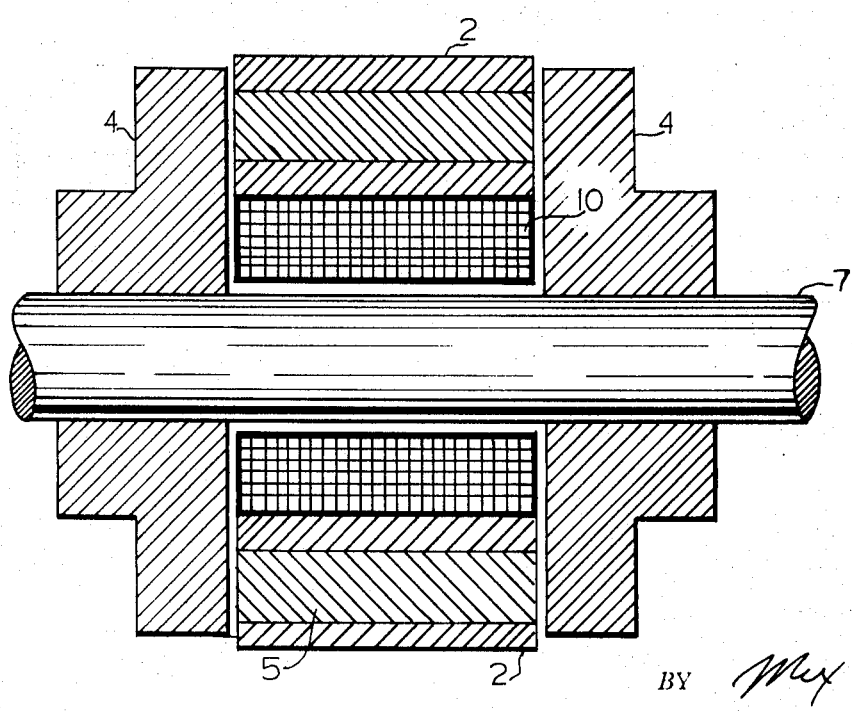
FIG. 2 is a cross-sectional view of the brake shown in FIG. 1.

The present invention and its method of manufacture can perhaps be most quickly understood from a study of FIGS. 1 and 2. Essentially the present invention is an AC generator with shorted turn output coils.

In FIGS. 1, 2 is a thick aluminum or copper plate. Three is one of two holes in flanges formed in said plate by which the plate may be attached to the chassis of a vehicle or similar nonrotating structure. Four is one of many iron arms attached or formed on a hub slipped over shaft 7 and keyed to said shaft by key 6. In the same FIG., 11 indicates one of four transverse vent holes for cooling. Five indicates one of several (eight) iron pins positioned transverse to the heavy conductive metal plate 2. These pins serve as cores. The metal immediately surrounding the iron pins serves as shorted turns around each pin.

In FIG. 2 the iron hubs with integral or attached iron arms are again indicated by 4. The pins traversing the conductive plate and parallel to the shaft 7 are again 5. The source of the direct magnetic field 10 has a hollow center and is fixed in the position shown so that when it is energized the hubs and arms 4 are magnetized respectively north and south. It can be seen that when the shaft turns the magnetized hub arms sweep past the iron pole pins and induce a voltage and a counter magnetic field in the conductive metal plate. Naturally, braking will be proportional to the current supplied to the central field coil up until magnetic saturation is approached.

Figure 3:
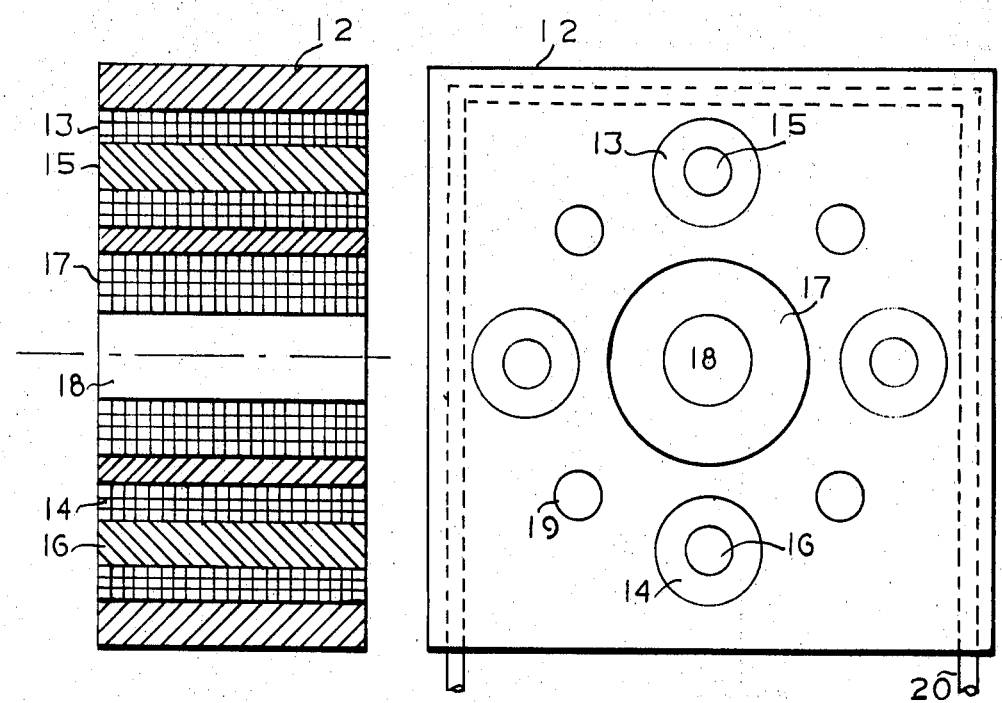
FIG. 3 shows an end view of the brake fitted with a second set of output coils designed to produce useful current. A cross section of the same brake is also shown.

In FIG. 3 the braked shaft aperture is indicated by 18, the central field coil by 17 and the iron core pins by 19. In addition to these pins (four) four additional iron cores or pins and associated coils, 13, 14, 15 and 16 are shown (a total of four coils). As can be seen, when the keyed shaft rotates and the aforementioned hubs and arms rotate along with it, the residual magnetism will generate small voltage which will energize field coil 17.

Figure 4:
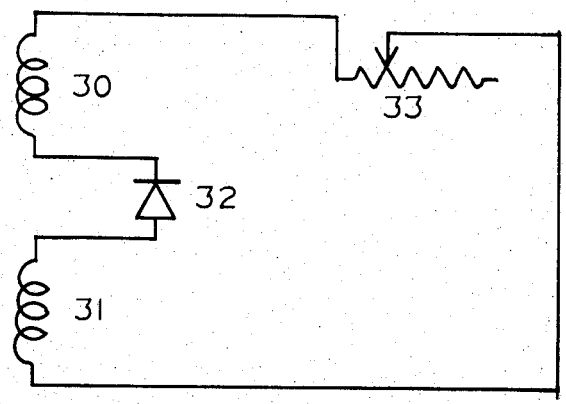
FIG. 4 shows the basic circuit configuration of the combined brake and generator shown in FIG. 3.

FIG. 4 depicts the basic circuit arrangement used with the self-energizing eddy current brake. All the armature coils connected in series (or parallel if so desired) are indicated by coil 30. The AC current generated is rectified by diode 32 and supplied to the central field coil marked 31. Current flow and braking is controlled by rheostat 33. This of course may be connected to a brake pedal or similar convenient means.

As most braking is required at high r.p.m., the required field current can be quickly produced. As shown in FIG. 4, a small "keep alive" current is always flowing. The value in amperes of this current can be set to suit individual situations.

As can be realized the massive conductive plate serves as an excellent heat sink. It may be exposed directly to the airstream and pierced by holes and its surface convoluted to increase its air contacting surface. In addition it may be made of several pieces of metal with internal channels for water cooling. One such channel and connecting inlet and outlet pipes is indicated in FIG. 3 by 20.

Although shaft 7 is shown fairly closely fitted to the hubs 4, there is no need for a tight fit. There may be considerable space between the shaft and the hubs and coupling between them accomplished with rubber or a similar material so that angular displacement and shock may be absorbed without damage to either the shaft or the brake.

Having described my invention and its manner of manufacture, this is what I claim as new and novel and desire to secure by Letters Patent.

I claim:

1. An eddy current brake comprising a hollow-core field coil positioned and supported axially within a conductive metal slab, a plurality of iron bars positioned within said slab and parallel to and generally circularly disposed about said field coil core, said iron bars being of a length equal to the thickness of said slab with the bar ends flush with the sides of said slab, and a pair of multiarm iron hubs pierced to accept an transverse shaft and keyed to turn therewith.

2. An eddy current brake comprising a field coil with a hollow core positioned axially within an electrically conductive slab of metal, said slab serving to position, support and cool a plurality of iron bars positioned within said slab in holes transverse to the major plane of said slab, said bars generally disposed in a circle equidistant from center of said field coil, all iron bars being equal in length to the thickness of said slab, and all iron bar ends being flush with sides of said slab, and said slab functioning as shorted turns for said iron bars, and a pair of multiarm iron hubs positioned to either side of said slab, said hubs being pierced to accept a transverse shaft and keyed to turn therewith.

3. A device as claimed in claim 2 wherein said electrically conductive slab is pierced by channels connected to suitable pipes for the admission and removal of a coolant.

4. A device as claimed in claim 2 wherein said electrically conductive slab is additionally pierced by holes for the passage of cooling air.

5. A device as claimed in claim 2 wherein a plurality of iron-cored coils are positioned within said metal slab, said iron-cored coils being transverse to the major plane of said conductive slab and generally parallel to said iron bars and generally disposed in a circle about said hollow-core field coil and said iron-cored coils being connecting to a rectifying means, a rheostat and a control means and to said hollow-cored field coil.